United States Patent
Meleshkevich et al.

(10) Patent No.: US 7,839,901 B2
(45) Date of Patent: Nov. 23, 2010

(54) HIGH POWER FIBER LASER SYSTEM WITH CLADDING LIGHT STRIPPER

(75) Inventors: Mikhail Meleshkevich, Westborrow, MA (US); Victor Ilyashenko, Norhtborror, MA (US); Oleg Shkurikhin, Shrewsbury, MA (US)

(73) Assignee: IPG Photonics Corporation, Oxford, MA (US)

( * ) Notice: Subject to any disclaimer, the term of this patent is extended or adjusted under 35 U.S.C. 154(b) by 54 days.

(21) Appl. No.: 12/315,437

(22) Filed: Dec. 3, 2008

(65) Prior Publication Data

US 2010/0135339 A1    Jun. 3, 2010

(51) Int. Cl.
*H01S 3/30* (2006.01)
(52) U.S. Cl. .............................. 372/6; 385/29; 385/124; 385/128
(58) Field of Classification Search ..................... 372/6; 385/29, 128
See application file for complete search history.

(56) References Cited

U.S. PATENT DOCUMENTS 5,352,712 A * 10/1994 Shustack ..................... 522/31
5,867,305 A * 2/1999 Waarts et al. ........... 359/337.12
7,349,596 B2   3/2008 Anderegg
2009/0080835 A1* 3/2009 Frith ............................ 385/50

* cited by examiner

*Primary Examiner*—Minsun Harvey
*Assistant Examiner*—Xnning Niu
(74) *Attorney, Agent, or Firm*—Y. Kateshou

(57) ABSTRACT

A powerful fiber laser system is configured with at least one gain block. The gain block includes an input fiber guiding a pump light, a multiclad active fiber receiving the pump light so that a major portion is absorbed in the core of the active fiber while a minor portion of the pump light propagates in the inner cladding of the active fiber, and a multiclad output fiber. The multiclad output fiber is configured with a core, guiding a signal lased by the core of the active fiber upon absorption of the major portion of the pump light, an inner cladding receiving the minor portion of the pump light and an outer cladding. The inner and outer claddings of the multiclad output fiber have respective refractive indexes which are selected so that the refractive index of the outer cladding is higher than that one of the inner cladding. The configuration of the output fiber allows for the removal of substantially the entire light from the inner cladding of the output fiber before the signal is emitted through the downstream end of the output fiber.

10 Claims, 2 Drawing Sheets

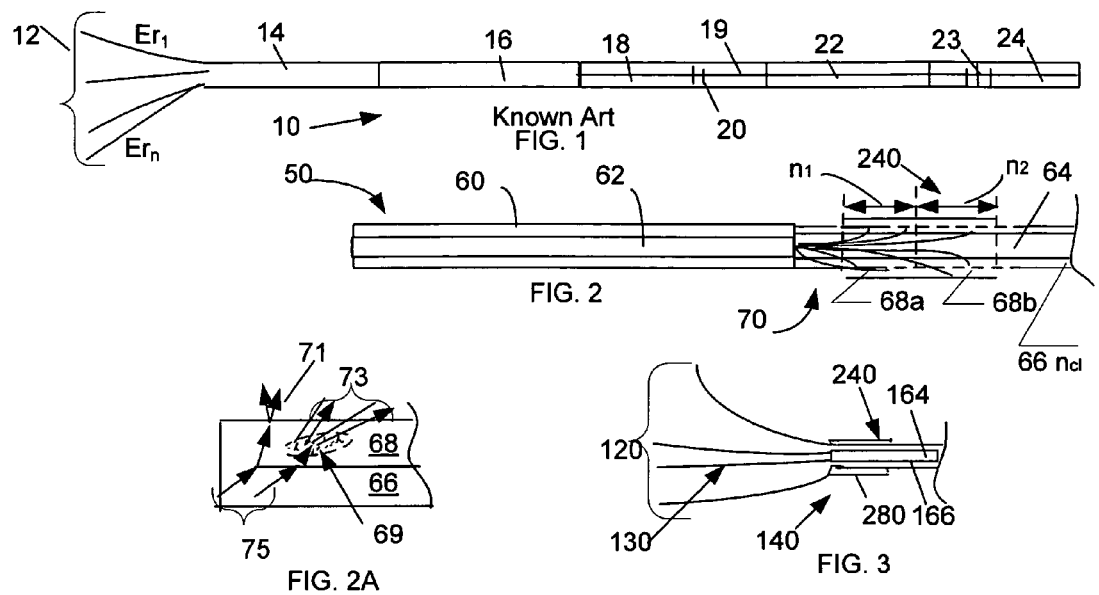
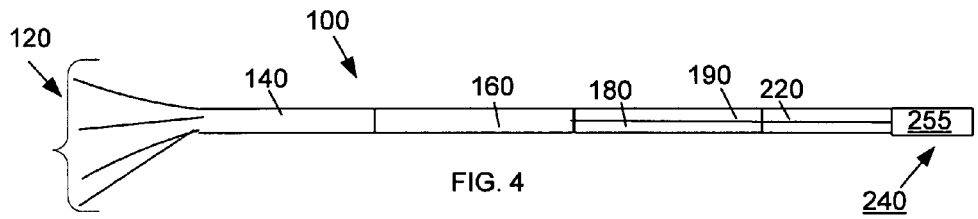
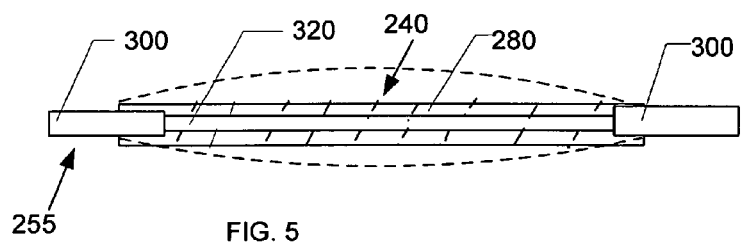
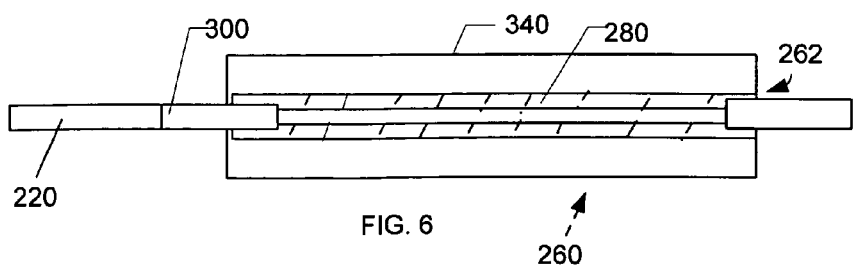

Known Art

HIGH POWER FIBER LASER SYSTEM WITH CLADDING LIGHT STRIPPER

BACKGROUND OF THE DISCLOSURE

1. Field of the Disclosure

The disclosure relates to powerful fiber lasers configured to substantially decouple parasitic pump signals from an inner cladding of multiclad output fiber.

2. The Prior Art Discussion

High power lasers are used for a variety of applications such as cutting and welding of metals. Among the most important parameters determining the usefulness of the laser source for these applications are the total optical power and the beam quality of the laser on the surface of the material. A low quality laser beam cannot be focused into a small spot and as a result the power density is insufficient for thermally induced changes in the material. Alternatively a high beam quality laser may be focused into a small spot but the beam diverges rapidly, making it hard to keep the material in focus.

The beam quality of light propagating along a fiber can be markedly improved if only the light supported by the core of the fiber is radiated. Unfortunately, in fiber lasers, the cladding of fiber may also support light at wavelengths either identical to those supported by the core or different therefrom.

The former can be observed, for example, in a combiner in which several fiber lasers are coupled together into a single fiber output fiber. Not all of the desired light is coupled into the core of the output fiber; some of it is supported by cladding and should be removed therefrom.

The light beams supported by a core and cladding of a fiber system, respectively, at different wavelengths are, for example, pump light propagating along the cladding and signal light guided in the core. If not substantially removed from the fiber, the light guided outside by cladding, may and will affect the quality of the signal light.

One of examples illustrating the above relates to a fiber laser configured with multiple claddings. The dual cladding fiber is comprised of a fiber with a small rare earth doped core, a surrounding undoped inner cladding and an outer cladding. Several different rare earth dopants may be used including, among others, Yb, Nd, Er and Tm. The outer cladding may be a lower index glass or polymer. Pump light with wavelength around the absorption band of the rare earth dopant is injected into the inner cladding and, while propagating through the inner cladding, excites the rare earth providing gain in the core area. The major advantage of the multiclad fiber, over the more traditional core pumped variety, is the large pump area and high numerical aperture. A low index outer cladding increases the NA of the inner cladding and permits collection of more pump light in the inner cladding. Single mode cores provide the highest beam quality. The beam quality of such lasers typically surpasses the requirements imposed by a variety of fiber laser applications.

When scaling to higher powers, it is important to optimize fiber for efficient coupling of the pump light, reduction of non-linear effects, high-conversion of pump light and good thermal properties. In terms of fiber features, this can be expressed, among others, as:

High numerical aperture;
Large core size;
Short fiber length; and
Low residual pump power.

FIG. 1 illustrates a powerful laser system 10 including an array of single mode lasers 12. The SM lasers are coupled together in a multimode combiner 14 having a MM output 16 guiding a pump signal, which can reach the order of kW, at a pump wavelength $\lambda p$. Having coupled to one another in combiner 14, lasers 12 generate pump light filling up the interior of combiner output 16 so that only one radiation mode is coupled into and supported by a core 19 of multiclad passive fiber 18 at the pump wavelength.

The multiclad fiber 18 couples the pump light into a rare-earth doped active fiber 22 which has a multiclad configuration and can operate either as a laser or an optical amplifier. A delivery passive multiclad fiber 24 is fused with the downstream end of fiber 22. A combination of multiclad fibers 18, 22 and 24 defines a gain block component of fiber system 10. If active fiber 22 is configured as an oscillator, fiber gratings 20 and 23 written, for example, in the cores of respective passive fibers 18 and 24 define a cavity therebetween and configured so that the laser signal is generated at desired wavelength $\lambda s$ different from wavelength $\lambda p$ of the pump signal. The end-pump configuration illustrated in FIG. 1 provides for a signal which is (a) powerful because of multiple pump lasers 12 and (b) high quality since core 19 of multiclad fibers 18, 22 and 24 supports substantially only a fundamental mode.

Multiclad fibers 18, 22 and 24 are not truly single mode fibers. In general, there are two types of modes in these fibers: a fundamental mode associated with the "single mode" core guided at desired signal wavelength $\lambda s$, and a number of higher-order modes guided by the outer boundary of the multimode waveguide at pump wavelength $\lambda p$. The output of the dual cladding fiber is complicated. Although the majority of the power is in the single mode core, there is enough power in higher order modes supported by the inner cladding.

The active fiber 22 should be of a substantial length in order to adequately absorb the powerful pump signal. Such a length, however, may be associated with at least two undesirable consequences. First, the greater the length, the greater the power loss due to nonlinear effects. Second, the greater the length, the father away the laser signal wavelength drifts from the desired one. Typically, even if the length of active fiber 22 is optimized, about 10% (about 10 dB) of the pump signal is still guided in the cladding of delivery fiber 24 at pump wavelength $\lambda p$. As a consequence, at the output of system 10 two signals—one at the desired wavelength and one at the parasitic pump wavelength—are emitted. Needless to say, the parasitic pump signal deteriorates the quality of the main/laser signal and, in fact, is simply unacceptable in many applications. The length reduction however leads to a substantial residual pump power in the cladding that could not be absorbed in the relatively short core.

The problem, discussed above, has been addressed in U.S. Pat. No. 7,349,596 which is fully incorporated herein by reference. The patent discloses a multiclad fiber including a core, inner cladding and outer cladding which are configured concentrically with one another. The outer and inner claddings have respective refractive indexes which substantially match one another. As known to one of ordinary skills in the fiber laser art, light travels between contacting mediums when the latter have respective indices which substantially match one another. The coupling of light is associated with elevated temperatures and continues until the refractive index of the outer cladding lowers below than that one of the inner cladding.

Since the indices of the respective inner and outer claddings as disclosed in the patent match each other, the light guided in the inner cladding may not be fully decoupled therefrom. The effective decoupling of light in accordance with the teaching of the patent is associated with the necessity of maintaining a desirable temperature of heat sink. To maintain the desired level of temperatures, the patent discloses a complicated cooling system rendering the disclosed configuration structurally complicated and cost-ineffective. Still a further concern associated with the matching indices is rather a great overall length of the light stripper sufficient for removing substantially the entire cladding-guided light.

A need, therefore, exists for a light stripper operative to effectively remove light from the cladding of a fiber waveguide.

A further need exists for a high power fiber laser system provided with a light stripper operative to remove pump light from the cladding in a cost-effective and simple manner.

SUMMARY OF THE DISCLOSURE

These needs are satisfied by a light stripper configured in accordance with the disclosure. The light stripper is configured with a coating applied upon the cladding of the fiber and having a refractive index greater than that one of the cladding. The indices of the respective coating and cladding are selected so that the light stripper is operative to substantially couple out undesirable lights from the cladding before outputting the desirable light signal.

The light coupling between two layers of differently configured materials is accompanied by elevated temperatures often detrimental to the outer layer before a substantial portion of the undesirable light is coupled out from the inner layer. The disclosed configuration allows for the selection of material of the outer layer/coating that can withstand critical temperatures associated with substantially total removal of undesirable light from the inner layer or cladding. Having the indices of respective cladding and coating known, it is possible to optimize the geometry of the light stripper and its length. Various applications of the light stripper are disclosed hereinbelow.

In accordance with one application, the disclosed light stripper may be configured as a module. One of numerous examples of the light stripper used as a component may be illustrated by a fiber combiner or coupler—a fiber component which combines a plurality of input fibers, such as a plurality of lasers. In accordance with the technique, well known to one of ordinary skills in the fiber laser art, the input fibers are bundled together and then withdrawn so as to reduce the overall outer diameter of the bundle. Some light is inevitably lost during the coupling of the input fibers and supported by the cladding of the combiner's output. Covering a portion of the cladding with a layer of material, whose index of refraction is selected to be controllably higher than that one of the output fiber's cladding, allows the lost light to be coupled out of the output fiber before it reaches the downstream faucet thereof.

In accordance with a further application, the disclosed light stripper is configured as an integral component of high power fiber laser system which includes, among others, a gain block pumped by a pump light at a pump wavelength an operative to radiate a light signal at a signal wavelength. The system is further configured with the disclosed light stripper provided along a region of output fiber, which guides the signal light downstream from the gain block. The outer layer of the light stripper is operative to remove or strip substantially the residual pump light, unabsorbed within the gain block by a rare-earth element doped (active) fiber, from the cladding of the output fiber before the light signal at the desired wavelength is output. The outer layer is configured with a refractive index which is not only higher that that one of the inner cladding, but also the index of the outer layer provides this layer with a thermo-defensive structure capable of withstanding high temperatures necessary for the removal of substantially the entire pump light.

In accordance with one modification of the disclosed light stripper, the refractive index of the outer cladding controllably changes over the portion of the output fiber. Such a configuration is advantageous when more than one undesirable light is supported in the output fiber.

Accordingly, a further application may also be associated with a high power fiber laser system in which the loss of even 1% of the signal light is significant. Typically, a high power system has a sequence of active fibers, which are doped with rare-earth elements fibers, and passive fibers. Even if two fused fibers are configured with respective mode filed diameters matching one another, a loss of optical power of light signal guided in the core typically may occur. The lost light propagates in the cladding of the downstream fiber, not in the core thereof, and also may be detrimental to the signal in the core. Concurrently, the pump light is also supported in the cladding. These two undesirable lights have different numerical apertures. Accordingly, if the disclosed light stripper is configured with adjacent regions having respective refractive indexes which progressively become higher, then an upstream region is operative to mostly strip the pump light while the downstream region removes the stray signal light.

BRIEF DESCRIPTION OF THE DRAWINGS

The above and other features of the disclosure will become more readily apparent from the specific description of the inventive system accompanied by the following drawings:

FIG. 1 is a diagrammatic view of a typical fiber laser system with an end-pumping configuration;

FIG. 2 is elevated side view of the light stripper configured in accordance with the present disclosure;

FIG. 2A is a diagrammatic representation of different types of materials used for making the coating of the light stripper of FIG. 2;

FIG. 3 is a side view of a fiber combiner provided with the disclosed light stripper;

FIG. 4 is a view of powerful fiber laser system with a light stripper configured in accordance with the present disclosure;

FIG. 5 is a diagrammatic view of the disclosed light stripper;

FIG. 6 is a diagrammatic view of an apparatus configured to manufacture the light stripper of FIGS. 2-5;

SPECIFIC DESCRIPTION

Figure 7:
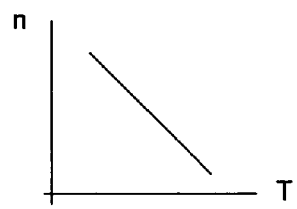
FIG. 7 is a graph illustrating the dependency of a refractive index from temperature.

Reference will now be made in detail to several embodiments of the invention that are illustrated in the accompanying drawings. Wherever possible, same or similar reference numerals are used in the drawings and the description to refer to the same or like parts or steps. The drawings are in simplified form and are not to precise scale. The word "couple" and similar terms do not necessarily denote direct and immediate connections, but also include connections through intermediate elements or devices.

FIG. 2 illustrates a lightguide including upstream and downstream fibers 50 and 70, respectively, guiding light along a light path from the upstream fiber toward the downstream fiber. The upstream fiber 50 is configured with a core 62 guiding a light signal at a signal wavelength, whereas downstream fiber 70 has a core 64 supporting the signal light as the latter propagates along the lightguide. The fibers are configured with substantially equal mode field diameters so as to prevent significant losses of the signal light at the border (splice) defined by the opposing ends of respective fibers 50 and 70.

The upstream fiber 50 is operative to radiate the signal light upon absorbing a pump light which is coupled into a cladding 60 of upstream fiber 50 by well known pumping arrangements including end and side pumping arrangements. Since the cores 62 and 64 of respective fibers 50 and 70 are substantially matched, the radiated light signal is coupled into core 64 of output fiber 70 with minimal losses. However losses, no mater how insignificant they can be, are associated with a stray signal which is not coupled into core 64 of fiber 70 and, thus, supported by a cladding 66 of fiber 70. The stray signal light may mess up with and detrimentally affect the output of the lightguide.

The signal light is radiated by upstream fiber 50, doped with one or a combination of rare-earth elements, as the pump light coupled into cladding 60 is absorbed by core 62 of upstream fiber 50. As much as the total absorption is desired, still a portion of pump light may remain unabsorbed and eventually is coupled into cladding 66 of downstream fiber 70. Moreover, the signal light supported in the core of fiber 50 may experience losses while propagating through a splice between fibers 50 and 70, respectively.

The downstream fiber 70 is configured with a light stripper 240 in accordance with this disclosure along a predetermined length of fiber 70. The light stripper 240 includes a coating 68 applied, for example atop cladding 66 and configured with an index of refraction "n" which is greater than the refractive index $n_{cl}$ of inner cladding 66. Assuming that the index of refraction of coating 68 is uniform, a substantial portion of one of the unabsorbed pump and lost signal lights will be stripped off cladding 66 before the output faucet of fiber 70.

To remove all parasitic lights guided in cladding 60 of fiber 70, light stripper 240 preferably has two or more sub-regions 68a and 68b, respectively, made from different materials which have different indices $n_1$ and $n_2$, each being greater than that one of inner cladding 60. If, for example, index $n_1$ of upstream portion or sub-region 68a is smaller than index $n_2$ of downstream sub-region 68b, the larger portion of light propagating at a greater angle, which is the pump light, will be stripped along upstream region 68a, whereas the greater portion of lost signal light will be mainly removed along downstream region 68b. Of course, the indexes may be selected in the reverse order so that both lights would be substantially coupled out along one of the regions.

The upstream and downstream fibers 50 and 70, respectively, have a multi-clad configuration. However, downstream fiber may be configured as a single-clad fiber. In this case, the single clad fiber also may be covered by a coating to form the disclosed light stripper. Furthermore, the core of downstream output fiber 70 is typically not doped with rare-earth ions.

While removing parasitic cladding lights from the inner cladding, the refractive index in the stripping region 68 of the outer cladding lowers, and the temperature in this region rises. The remaining portion of the light that has not been removed from the sub-region propagates further to the next sub-region of light stripper 240. However, the material of coating 68 is selected so that the temperature never reaches a critical or threshold temperature capable of damaging the coating along any localized sub-region while a maximum amount of pump and other parasitic lights are removed.

Referring to FIG. 2A, the material or materials of coating 68 associated with high power laser systems in the order of kW are selected to withstand temperatures of about 300° C. For example, coating 68 may include only one material, such as Diphenyl Dimethyl Poly Siloxane copolymer (DDPSP), or a combination of materials, such as DDPSC and Dymethyl Polysiloxane Polysiloxane polymer (DPPP). The physical manifestation of the above disclosed materials includes the transparency. While DDPSC is transparent, the combination of DDPSC and DPPP is translucent. The difference is important because in transparent materials, light 75 to be removed from inner cladding 66 is dispersed through a localized region 71 of coating 68. In high power laser systems, such a concentrated light beam may be thermally hazardous to the material within localized region 71. Adding DPPP to the DDPSC creates regions 69 in coating 68 filled with particles of DPPP each of which has a size comparable to the wavelength of light 75. The light 75 propagating through coating 68 hits the particles and, in a way, brakes into numerous beams 73 which, while leaving coating 68, are distributed among spaced apart sub-regions. Accordingly, the power of each beam is relatively low and may not be dangerous to coating 68. In practice, the disclosed stripper may be provided with coating 68 having adjacent regions made from respective transparent and translucent materials. Alternatively, of course, entire coating 68 may be made from either transparent or translucent material.

FIG. 3 illustrates a coupler 140 formed as a result of combining a plurality of lasers 120 and withdrawing the coupled outputs of respective lasers 120 so as to decrease the outer diameter. Typically, the light propagates through a central region 130 of the coupler and is coupled into broad core 164 of the output fiber. To ensure that the coupled light is not coupled out from core 164 of the output fiber, the latter is covered by cladding 166 having a refractive index lower than that one of core 164. However, a small portion of the light emitted by coupled lasers 120 still ends up guided in cladding 166. To remove this light, a region of cladding 166 is covered by a coating 280 configured with a refractive index higher than that one of cladding 166. As a result, coating 280 and cladding 166 in combination define a light stripper 240 structured in accordance with the disclosure. The refractive index of coating 280 is controllably selected to be so greater than the refractive index of inner cladding 166 that the maximum amount of pump light is removed along a relatively short length of stripper 240. Moreover, the index of refraction of coating 280 is selected so that the material of coating 280 will not be damaged since elevated temperatures associated with the removal of light may not reach critical values despite the fact that substantially maximum of light is removed. The coupler may be manufactured as a separate element, such as an individual laser. Alternatively, the structure shown in FIG. 3 may function as a pump module used in high power fiber laser systems.

FIG. 4 illustrates a fiber laser system 100 operative to radiate a powerful light signal. The system 100 includes an optical source configured with plurality of fiber lasers 120. The lasers 120 can be selected from MM laser diodes, but preferably are single mode (SM) fiber lasers, such as ER-doped lasers each radiating a pump light λp at about 1550 nm wavelength and coupled together in the configuration shown in FIGS. 3a and 3b with or without the disclosed light stripper. The outputs of respective lasers 120 are combined in MM combiner 140 with its output 160 delivering the combined low-mode pump signal, which has, for example, the $M^2$ factor not exceeding 10, into a multiclad active fiber 220. Of course, combiner 140 may or may not be configured in accordance with configuration of FIGS. 3a and 3b. In an optically pumped fiber laser or amplifier, fiber 220 has a gain medium radiating a signal light as pump light absorbs.

Only absorbed pump light can be useful. Accordingly, as the pump light propagates along active fiber 220, a major part thereof is absorbed in the core. The residual, unabsorbed pump light, however, is still supported by the inner cladding thereof and should be coupled out before system 100 radiates the light at the desired wavelength λs. The stripping of the undesirable pump light is realized by disclosed light stripper 240. Furthermore, an insignificant portion of the signal light may be lost at splices formed by adjacent fused fibers 220 and, for example, an output fiber 255. However, even a 1% loss of the signal light can be detrimental to the output signal and this, desirable should be removed from the output fiber before it emits the light signal.

The light stripper 240 is configured as part of output multiclad passive fiber 255 and includes a core, at least one inner cladding 320 surrounding the core, and an outer cladding 300 coated over inner cladding 320. In contrast to the disclosed prior art, a region of outer cladding or coating 280 is configured with a refractive index $n_{ic}$ which is higher than refractive index $n_c$ of inner cladding 320. The coating 280 is placed over a certain length of inner cladding 320 upon removing original coating 300 therefrom. Thus, the disclosed light stripper is operative to substantially couple out the non-absorbed pump light from inner cladding 320 in a simple manner which does not require the utilization of the complex and cost-ineffective cooling system of the prior art. To remove both signal loss light and unabsorbed pump light, the light stripper may be configured with outer cladding 300 provided with materials which have different indices, as disclosed above.

As understood by one of ordinary skills in the laser arts, the coupling of the pump light into coating 280 is associated with a thermal reaction. The higher the temperature rises, the lower the refractive index falls, as illustrated in FIG. 7. The disclosed relationship between the indices of refraction of respective inner 320 and outer 280 layers allows for stripping more light than can be done using the prior art configuration at each sub-region of the stripper. Preferably, the material of coating 280 may withstand temperatures as high as about 300° C. without any sophisticated temperature control system The decoupling process includes gradually removing the pump light from inner cladding 320 as the latter propagates along successive sub-regions of outer cladding 280. Thus, when refractive index $n_{ic}$ of a localized region of outer cladding 280 becomes smaller than that one of inner cladding 320. For small apertures of light, the maximum amount of pump light is coupled out from the localized region of the inner cladding. The residual pump light propagates along subsequent sub-regions gradually loosing portion after portion thereof until substantially the entire pump light is stripped.

The refractive index $n_{ic}$ of outer cladding 280 may be uniform along the entire stripping region of inner cladding 320. Alternatively, outer cladding 280 may be configured with a succession of regions having respective refractive indexes $n_{ic}$ which differ from one another, but still greater than the index of inner cladding 320, as shown in FIG. 2. Since the unabsorbed signal and pump lights have different numerical apertures and different wavelengths and thus different angles of propagation in output fiber 255, it is preferable to have light stripper 240 configured with multiple regions configured from different materials. The materials are selected with respective indices which are different from one another but both greater than that one of inner cladding 320. Accordingly, the indices are so selected that the removal of light is not associated with critical temperatures under the known conditions.

For example, refractive index $n_{ic}$ of each subsequent downstream region of outer cladding (coating or layer) 280 may be higher than that one of the preceding region. Conversely, subsequent regions of outer cladding 280 may be configured with gradually decreasing refractive index $n_{ic}$ as disclosed above.

The outer cladding 280 may be configured from a variety of materials including, but not limited to, a gel, liquid, epoxy or any other type that is selected with a refractive index grater than refractive index $n_c$ of inner cladding 320 made from fused silica.

Each material, of course, has a thermal threshold at which this material can be destroyed; however because of the proper selection of the refractive indices a critical thermal threshold can be unlikely reached while the maximum amount of pump light in each sub-region of the stripper is removed. Based on the selected indices and given input power disclosed, the geometry of the light stripper, which can be straight or curved, and the length thereof can be theoretically determined. This disclosure, like the known prior art systems, provides for a self-regulating thermal stripping process. In contrast to the prior art, the refractive index of the outer cladding is selected to be greater than that one of the inner cladding at such a value that the critical temperature, capable of destroying the outer cladding before the desired amount of pump light is stripped, would be unlikely reached at any localized region of the light stripper.

The active fiber 220 may be doped with thulium lasing signal at about a 2 mc wavelength. In a further example, laser system 100 may be configured with ER-doped active fiber 220 lasing the signal at about or above 1530 nm wavelength, whereas pump lasers 120 each are configured as Raman laser generating the pump output at a wavelength ranging from about 1480 to about 1510 nm. In a further example, the SM fiber lasers 120 each are an Yb/Er laser operative to radiate the pump light at a wavelength varying between about 1530 and about 1540 nm and coupled into Er-doped active fiber 220 lasing the system signal at about 1560-1600 nm. Still a further modification of system 100 includes SM fiber Er/Yb lasers 120 outputting pump light at a wavelength of about 1550-1600 nm, and Tm-doped active fiber 220 operative to lase the system signal a wavelength in a range from about 1750 to about 2100 μm. In a further possible modification, SM pump fiber lasers 120 each include a Nd-doped laser generating the pump light at a wavelength of about 920-945 nm, whereas active fiber 220 is doped with Yb ions to radiate a system signal in a range between about 975 nm to about 1 μm band. Another example of powerful fiber system 100 is represented by a plurality of Yb-doped SM fiber lasers 120 each generating the pump light at a wavelength of about 975-1030 nm which is coupled into Yb-doped active fiber lasing the system signal at a wavelength from about 1030 to about 1120 nm.

FIG. 6 illustrates a device 260 for manufacturing the disclosed light stripper and includes a housing 340 provided with an elongated groove 262. The length of output fiber 255 stripped from original coating 300 is placed within the groove. Thereafter, outer cladding 280 fills up groove 262 so as to surround inner cladding 280. The groove may be differently shaped including a somewhat arcuate shape with a greater thickness in the middle of the elongated stripping region and smaller thickness at the opposite ends thereof, as shown in dash lines in FIG. 5. Furthermore, groove 262 may have more than one curved stretch. Knowing the value of refractive indices of the respective inner and outer claddings and the numerical aperture of the stripped light, groove 262 may be provided with a predetermined length and geometry for specifically selected materials of the outer cladding. As can be seen, groove 262 may be formed with a uniform cross-section or with a variable cross-section. The outer coating/cladding 280 may have a uniform thickness or variable thickness with the mid-region provided with the greatest thickest.

Figure 8:
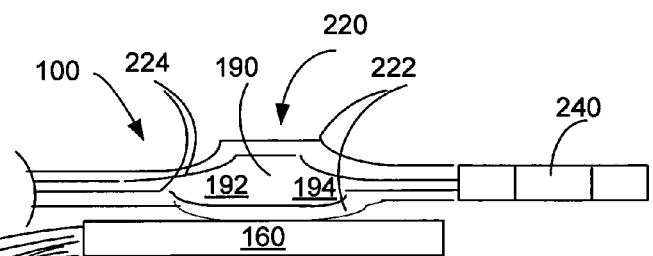
FIG. 8 is a view of the disclosed powerful fiber system configured with one embodiment of a side-pumping arrangement.
Figure 9:
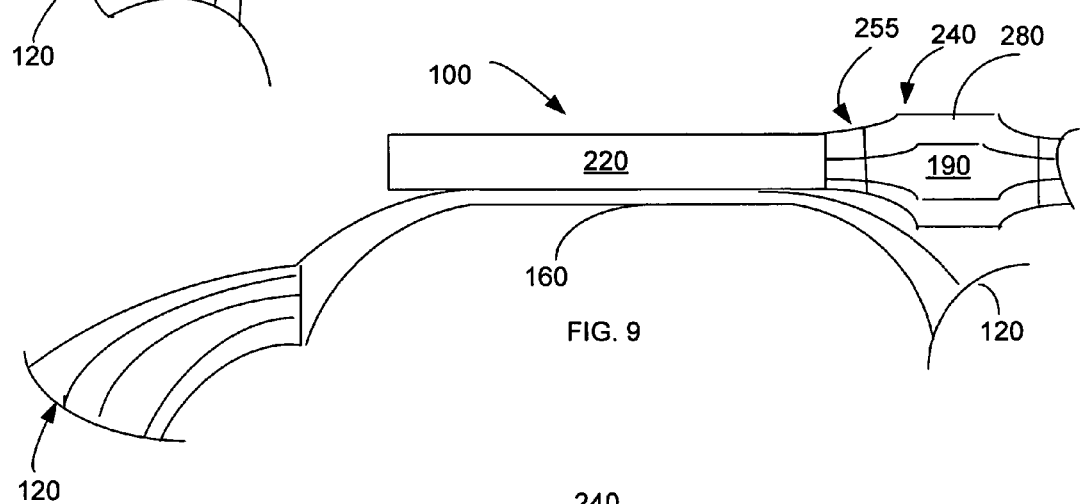
FIG. 9 is a view of the disclosed powerful fiber system configured with a further embodiment of the side-pumping arrangement.

FIGS. 8 and 9 illustrate a further modification of disclosed powerful fiber optic system 100 provided with a side pumping configuration. Similar to the end-pumping configuration of FIG. 4, a plurality of SM or MM lasers are combined together by a MM combiner with output 160 extending along the outer cladding of multiclad active fiber 220. The pump light is coupled into the inner cladding of active fiber 220 and is gradually absorbed in the core thereof. The active fiber 220 is configured to mode-match with multimode passive output fiber 255. The latter is provided with the disclosed light stripper which is operative to remove the pump and stray signal lights from the inner cladding thereof.

As mentioned above, in addition to low residual pump power, fiber system 100 should be characterized by a large core size of active fiber and a short length thereof. The larger the core size, the larger the mode diameter. The shorter the length, the less significant nonlinear effects and, thus, power losses. Furthermore, the greater the difference between outer diameters of respective active 190 and pump 160 fibers, the greater the absorption rate.

Accordingly, FIG. 8 illustrates active fiber 220 provided with a double-neck bottle-shaped cross-section and, thus, having the claddings and core with respective mid-regions expanded relative to the opposite ends of this fiber. The core 190, thus, having two transitional regions 192, 194 each configured to provide for adiabatic expansion minimizing the possibility of coupling the fundamental mode, which is supported by the core, with higher modes in the cladding. The outside surface of double-neck bottle-shaped active fiber 220 extending along the radially expanded mid region of this fiber and a portion of pump fiber 260 are in optical contact. Preferably, the optically coupled portions of the respective fibers are mechanically coupled to one another. The shapes of the enlarged or widened central region can vary subject to the adiabatic expansion of light. Furthermore, while the illustrated pumping arrangement is shown to be unidirectional, one of ordinary skills in the fiber laser arts readily understands that a bidirectional pumping configuration can be used as well.

FIG. 9 illustrates the same concept as FIG. 8, but shows system 100 having pump fiber 160 with the reduced central region. Such a configuration provides for a higher power density of the pump light and, in addition to the above discussed structural advantages, the increased absorption rate. Of course, the side-pumping configuration may include the pump and active fibers each having a constant cross-section. The multiclad passive output fiber or light stripper 240 also may be shaped as a double-neck bottle with the disclosed light stripper provided along the expanded region where the optical power density relative low. One of the advantages of utilizing the double-neck bottled light stripper 240 is to minimize the detrimental effect high temperatures may have on the integrity of this fiber and particularly on outer cladding 280. As can be readily understood, a further configuration of fiber laser system 100 may include a combination of active 220 and passive 255 fibers with the latter provided with double-neck bottle-shaped light stripper 240. While only a single gain block configured of input fiber 180 and multiclad active 220 and output 255 fibers is discussed hereinabove, it is understood that many gain blocks can be provided. For example, powerful fiber laser system 100 may include an oscillator block and one or more amplifying blocks each configured similarly to the one shown in FIGS. 4, 8 and 9.

Figure 10:
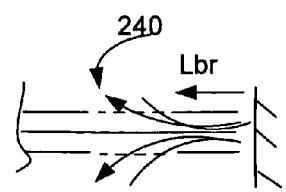
FIG. 10 is a view of the high power fiber laser system provided with the light stripper operative to remove backreflected light.

FIG. 10 illustrates a further implementation of the disclosed light stripper 240. As known to one of ordinary skills in the fiber laser arts, light tends to be reflected back if it is incident upon obstacles, such as splices or surfaces to be treated. The major portion of the back reflected light is typically coupled into the core. However, the minor portion is supported by a cladding and should be removed as well. This is attained by disclosed light stripper 240.

Although shown and described is what is believed to be the most practical and preferred embodiments, it is apparent that departures from specific configurations described and shown will suggest themselves to those skilled in the fiber laser art and may be used without departing from the spirit and scope of the invention. The present invention is not restricted to the particular constructions described and illustrated, but should be construed to cohere with all modifications that may fall within the scope of the appended claims.

The invention claimed is:

1. A lightguide, comprising:
   a fiber having a core and cladding guiding respective light signals; and
   a light stripper including a coating upon the cladding, the coating and cladding having respective indexes of refraction, the index of refraction of the coating being greater than that one of the cladding and selected so that a temperature, generated upon removing of substantially the entire light from the cladding, does not reach a critical temperature sufficient to damage material of the coating, wherein the index of refraction of the coating varies along a region of the fiber.

2. The light guide of claim 1, wherein the coating is made from material selected from the group consisting of transparent and translucent materials.

3. A high power fiber laser system, comprising:
   a gain block lasing a signal light in response to a pump light coupled into the gain block, the gain block having a multiclad output fiber configured with a core, which supports the signal light, inner and outer claddings, the inner cladding guiding a portion of the pump light, the outer cladding having a refractive index selected so that the pump light is removed from the inner cladding at temperatures insufficient to damage material of the outer cladding, the outer cladding of the output fiber being configured with a succession of sub-regions having respective refractive indexes which differ from one another and are selected so that a major portion of the unabsorbed pump light is removed along one of the sub-regions and a major portion of the lost signal light is removed along another one of the sub-regions.

4. The fiber laser system of claim 3, wherein the refractive indexes of the respective sub-regions of the outer cladding of the multiclad output fiber progressively increase or progressively decrease towards a downstream end of the multiclad output fiber.

5. The fiber laser system of claim 3, further comprising a pump assembly configured with a plurality of fiber lasers, the fiber lasers having respective outputs coupled together into a delivery fiber which couples the pump light into the gain block which is configured with a multiclad active fiber, wherein the delivery fiber and multiclad active fiber of the gain block have respective outer surfaces optically coupled together in an arrangement selected from a side-pumping arrangement and end-pumping arrangement.

6. The fiber laser system of claim 5, wherein the active fiber includes a core and inner and outer cladding concentric with the core, the core and cladding of the active fiber have respective double-neck bottle-shaped cross sections.

7. The fiber laser system of claim 3, wherein the core and claddings of the output fiber have respective double neck bottle-shaped cross sections.

8. The fiber laser system of claim 5, wherein the fiber lasers of the pump assembly each are doped with a combination selected from the group consisting of:

Yb and Er ions, the fiber lasers each radiating the pump light at the pump wavelength of about 1530 -1600 nm whereas the multiclad active fiber is doped with Tm ions and generates the system signal within a range between about 975-2100 nm wavelength, a Raman shifter generating the pump light at the pump wavelength which varies between about 1480 to about 1510 nm, whereas the multiclad active fiber is doped with Er ions so as to generate the system signal at about or above 1530 nm, Nd ions, the fiber lasers each generating the pump light at the pump wavelength ranging between about 920 to about 945 nm, whereas the multiclad active fiber is doped with Yb ions so as to generate the system signal in a range between about 974 to about 1000 nm, and Yb ions, the fiber lasers each generating the pump light at the pump wavelength from about 1000 -1030 nm, whereas the multiclad active fiber is doped with Yb ions so as to generate the system signal in a range between about 1050 to about 1100 nm.

9. The fiber laser system of claim 3, wherein the outer cladding is made from material selected from the group consisting of transparent and translucent materials.

10. A lightguide, comprising:

a plurality of fiber lasers having respective outputs coupled to one another to form a fiber coupler;

an output fiber guiding the coupled outputs from the coupler and having a core and at least one cladding; and a coating applied upon at least a part of the one cladding and configured with a refractive index which is greater than that one of the one cladding, wherein the refractive index of the coating varies.

* * * * *